United States Patent
Miao et al.

(10) Patent No.: US 10,432,373 B2
(45) Date of Patent: Oct. 1, 2019

(54) METHOD AND APPARATUS FOR FACILITATING REFERENCE SIGNAL TRANSMISSION

(71) Applicant: Telefonaktiebolaget LM Ericsson (publ), Stockholm (SE)

(72) Inventors: Qingyu Miao, Beijing (CN); Huaisong Zhu, Beijing (CN); Jianfeng Wang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 120 days.

(21) Appl. No.: 15/524,729

(22) PCT Filed: Apr. 11, 2017

(86) PCT No.: PCT/CN2017/080040
§ 371 (c)(1),
(2) Date: May 5, 2017

(87) PCT Pub. No.: WO2017/177887
PCT Pub. Date: Oct. 19, 2017

(65) Prior Publication Data
US 2018/0198581 A1    Jul. 12, 2018

(30) Foreign Application Priority Data
Apr. 11, 2016    (WO) ................ PCT/CN2016/078965

(51) Int. Cl.
*H04L 5/00*    (2006.01)
*H04L 5/14*    (2006.01)
(Continued)

(52) U.S. Cl.
CPC .............. *H04L 5/0048* (2013.01); *H04L 5/00* (2013.01); *H04L 5/001* (2013.01); *H04L 5/0085* (2013.01);
(Continued)

(58) Field of Classification Search
CPC ......... H04L 5/0048; H04L 5/00; H04L 5/001; H04L 5/0085; H04L 5/0091;
(Continued)

(56) References Cited

U.S. PATENT DOCUMENTS

| | | | | |
|---|---|---|---|---|
| 2012/0083278 A1* | 4/2012 | Kazmi | ................ | H04W 36/06 455/440 |
| 2013/0250911 A1* | 9/2013 | Kwon | ................ | H04W 56/00 370/331 |

(Continued)

FOREIGN PATENT DOCUMENTS

| | | |
|---|---|---|
| CN | 105323811 A | 7/2014 |
| WO | 2011 120716 A1 | 10/2011 |

(Continued)

OTHER PUBLICATIONS

3GPP TS 36.211 v14.3.0; Technical Specification—Jun. 2017.
(Continued)

*Primary Examiner* — Sai Ming Chan
(74) *Attorney, Agent, or Firm* — Baker Botts, LLP

(57) ABSTRACT

Embodiments of the present disclosure provide methods, apparatuses and computer program for facilitating reference signal transmission. An example method can be implemented at a base station in a wireless communication system for communicating with a terminal device. The terminal device is configured with a primary carrier and a secondary carrier for carrier aggregation. The method comprises determining a measurement gap. The measurement gap indicates a time interval for a terminal device to switch from the primary carrier to the secondary carrier for transmitting a reference signal to the base station over the secondary carrier and switch back to the primary carrier. The method also comprises triggering the terminal device to transmit the reference signal over the secondary carrier according to the measurement gap and obtaining a channel estimation based (Continued)

on the reference signal received from the terminal device during the measurement gap. By virtue of the method, the base station is enabled to request and control reference signal transmission on a secondary carrier from the terminal device, thereby obtaining CSI of the secondary carrier. Furthermore, since transmission of the reference signal is restricted to the measurement gap known by the base station, negative impact to the primary carrier can be minimized.

20 Claims, 7 Drawing Sheets

(51) Int. Cl.
- H04L 27/26 (2006.01)
- H04L 25/02 (2006.01)
- H04W 56/00 (2009.01)
- H04W 74/08 (2009.01)
- H04B 7/06 (2006.01)

(52) U.S. Cl.
CPC .......... *H04L 5/0091* (2013.01); *H04L 5/1469* (2013.01); *H04L 25/0202* (2013.01); *H04L 27/2655* (2013.01); *H04W 56/001* (2013.01); *H04W 74/0833* (2013.01); *H04B 7/0617* (2013.01); *H04L 5/0023* (2013.01)

(58) Field of Classification Search
CPC ............... H04L 5/1469; H04L 25/0202; H04L 27/2655; H04W 56/001; H04W 74/0833

USPC ......................................................... 370/350

See application file for complete search history.

(56) References Cited

U.S. PATENT DOCUMENTS

| | | | |
|---|---|---|---|
| 2014/0056395 A1 | 2/2014 | Alriksson et al. | |
| 2016/0037550 A1* | 2/2016 | Barabell | H04B 17/318 455/450 |
| 2017/0013630 A1* | 1/2017 | Franz | H04W 24/10 |

FOREIGN PATENT DOCUMENTS

| | | |
|---|---|---|
| WO | 2015 115772 A1 | 8/2015 |
| WO | 2015 170284 A2 | 11/2015 |

OTHER PUBLICATIONS

3GPP; Carrier Aggregation Explained; The Mobile Broadband Standard; A Global Initiative by Jeanette Wannstraom—Jun. 2013.

PCT Written Opinion of the International Searching Authority for International application No. PCT/CN2017/080040—dated Jun. 30, 2017.

PCT International Search Report for International application No. PCT/CN2017/080040—dated Jun. 30, 2017.

\* cited by examiner

METHOD AND APPARATUS FOR FACILITATING REFERENCE SIGNAL TRANSMISSION

PRIORITY

This nonprovisional application is a U.S. National Stage Filing under 35 U.S.C. § 371 of International Patent Application Serial No. PCT/CN2017/080040 filed Apr. 11, 2017, and entitled "Method And Apparatus For Facilitating Reference Signal Transmission" which claims priority to International Patent Application Serial No. PCT/CN2016/078965, filed Apr. 11, 2016, all of which are hereby incorporated by reference in their entirety.

TECHNICAL FIELD

The non-limiting and example embodiments of the present disclosure generally relate to the technical field of wireless communications, and specifically to methods, apparatuses and computer programs for facilitating reference signal transmission.

BACKGROUND

This section introduces aspects that may facilitate better understanding of the disclosure. Accordingly, the statements of this section are to be read in this light and are not to be understood as admissions about what is in the prior art or what is not in the prior art.

In a mobile communication system, in order to improve data rate and signal transmission/reception performance, multiple antenna techniques have been widely used. For instance, a signal transmitted from multiple antennas can be weighted in both magnitude and phase by beam-forming so as to produce spatial selectivity, that is, to produce a constructive signal power gain in a desired direction and null or attenuated interference power in other directions.

Eigenvector based beam (EBB) and Grid of beam (GOB) are conventional beam-forming approaches. In general, the EBB approach provides better performance, especially in a multipath channel where the performance gain is even more prominent.

In order to generate proper weights for different beams, channel state information (CSI) is needed at the transmitter side. For a time division duplex (TDD) system, when the user speed is below a certain threshold, channel impulse responses for uplink (UL) and downlink (DL) may be considered as the same or having a difference that can be neglected. In such a case, channel reciprocity between UL and DL exists. A reciprocity based multi-antenna solution is the most forward-looking multi-antenna technique for a TDD system, and has the highest performance potential for dedicated data transmission and reception. This solution relies on the strictest, so-called "coherent", form of reciprocity, which is achievable only in the TDD system where the receiving (RX) and transmitting (TX) channels are considered as the same within a coherent time interval. By utilizing channel reciprocity, instantaneous channel information can be obtained based on uplink measurements and then used for both uplink and downlink beam-forming, thereby enabling full exploitation of the angular spread.

Reference signals can be transmitted to facilitate channel estimation/measurement at receiver side. In a Long Term Evolution (LTE) system developed by the Third Generation Partnership Project (3GPP), a Sounding reference signal (SRS) is used to enable uplink channel measurement. In LTE, the SRS transmission depends on a configuration set by a signaling message (e.g., System Information Block 2 (SIB2), Radio Resource Control (RRC) Connection Setup, RRC Connection Reconfiguration etc.). A terminal device may transmit the SRS every two subframes at the most and every 32 frames (i.e., 320 subframes) at the least. A 10 bit signaling parameter "srs-ConfigIndex" informs the terminal device of the periodicity of SRS transmission and a SRS transmission period can be one of 2, 5, 10, 20, 40, 80, 160 and 320 ms. Furthermore, there is also an option for the terminal device not to transmit the SRS at all. More details of the SRS can be found in 3GPP TS 36.211, section 5.5.3 "Sounding reference signal", for example.

The next generation wireless communication system (also referred to as the fifth generation (5G), or NR) is being studied, and a reciprocity reference signal (RRS) similar to the SRS has been proposed for use in the NR system to extract the CSI for a transmitter (CSI-T) and to generate the DL beamforming weights accordingly.

Carrier aggregation (CA) is another technique exploited in a wireless communication system for boosting system capacity and data rate. Generally, a higher data rate requires more spectrum bandwidth and higher spectrum efficiency. With CA, the available spectrum can be located across several frequency bands, and by combining different carriers, both the peak data rate and total throughput can be maximized. Another advantage of CA is that load-balancing across frequencies and systems can be easily performed when there is congestion in one frequency band, while unused capacity is available in another frequency band. Carrier aggregation also enables a combination and efficient utilization of a plurality of non-contiguous or narrow (e.g., 5 MHz or less) channel bandwidths.

In an LTE-Advanced (also referred to as LTE-A) system, CA has been adopted in order to increase the bandwidth, and thereby increasing the data rate. In order to keep backward compatibility with LTE Release 8 (also referred to as R8) and Release 9 (also referred to as R9) user equipments (UEs), the carrier aggregation in LTE-A is based on R8/R9 defined carriers. There may be a few different carrier aggregation scenarios. For example, intra-band contiguous carrier aggregation is a straightforward way to arrange carrier aggregation, where contiguous component carriers within the same operating frequency band (as defined for LTE) are aggregated. This might not always be possible, however, due to operator's frequency allocation scenarios. Non-contiguous carrier aggregation is another option.

Currently, for a wireless communication system with CA, a UE usually transmits uplink signals only on a primary carrier (also referred to as Primary cell, Pcell, or Pcell carrier hereafter) and receives downlink signals on selected carriers which may include the primary carrier and one or more secondary carriers (also referred to as Secondary cell, Scell, or Scell carrier hereafter) to boost the downlink capacity. However, in conventional CA approaches, system performance might be degraded. For example, for secondary carriers without uplink transmission from the UE, the corresponding channel state information (CSI) can hardly be obtained by the network side.

SUMMARY

Various embodiments of the present disclosure mainly aim at providing methods, apparatus and computer programs for facilitating reference signal transmission in a wireless communication system, particularly with CA. Other features and advantages of embodiments of the present disclosure will also be understood from the following description of specific embodiments when read in conjunction with the accompanying drawings, which illustrate, by way of example, the principles of embodiments of the present disclosure.

In a first aspect of the disclosure, there is provided a method in a base station for communicating with a terminal device in a wireless communication system. The terminal device is configured with at least a primary carrier and a secondary carrier for carrier aggregation. The method comprises determining a measurement gap. The measurement gap indicates a time interval for the terminal device to switch from the primary carrier to the secondary carrier for transmitting a reference signal to the base station over the secondary carrier and to switch back to the primary carrier. The method also comprises triggering the terminal device to transmit the reference signal over the secondary carrier according to the measurement gap and obtaining a channel estimation based on the reference signal received from the terminal device during the measurement gap.

In one embodiment, the method may further comprise transmitting a configuration message to the terminal device. The configuration message indicates at least one of the following: information for the measurement gap, a reference signal sequence to be transmitted, periodicity of the transmission of the reference signal, a resource reserved for the transmission of the reference signal over the secondary carrier, and a time offset between uplink synchronization for the primary carrier and uplink synchronization for the secondary carrier. In another embodiment, the information for the measurement gap may include a parameter selected from a predefined set of parameters for the measurement gap.

In still another embodiment, said determining the measurement gap may be based on at least one of: a determination as to whether the primary carrier and the secondary carrier are in a same frequency band, and a predefined configuration for the measurement gap.

In some embodiments, the method may further comprise determining periodicity of the transmission of the reference signal based on at least one of: a beam-forming scheme to be used for downlink transmission to the terminal device; and mobility of the terminal device.

In one embodiment, the terminal device may be configured with a further secondary carrier. In this embodiment, the triggering may comprise triggering the terminal device to transmit the reference signal over the secondary carrier and the further secondary carrier sequentially according to the measurement gap.

In another embodiment, the method may further comprise determining whether uplink synchronization of the secondary carrier is obtainable from uplink synchronization of the primary carrier and indicating a result of the determination to the terminal device. In still another embodiment, said determining whether uplink synchronization of the secondary carrier is obtainable from uplink synchronization of the primary carrier is performed by determining whether the primary carrier and the secondary carrier are co-located. In one embodiment, in response to determining that uplink synchronization of the secondary carrier is unobtainable from the uplink synchronization of the primary carrier, the result of the determination may be implicitly indicated to the terminal device by triggering a random access procedure for the terminal device.

In one embodiment, the wireless communication system is a Time Division Duplex (TDD) system. The channel estimation may be obtained by obtaining a downlink channel estimation, based on the reference signal received from the terminal device in the uplink and channel reciprocity between the downlink and the uplink of the wireless communication system.

By virtue of the method in various embodiments as described above, the base station is enabled to request and control reference signal transmission on a secondary carrier from the terminal device, thereby obtaining CSI of the secondary carrier. Furthermore, since transmission of the reference signal is restricted to the measurement gap known by the base station, negative impact to the primary carrier can be minimized.

In a second aspect of the disclosure, there is provided a method in a terminal device for communicating with a base station in a wireless communication system. The terminal device is configured with at least a primary carrier and a secondary carrier for carrier aggregation. The method comprises receiving a trigger from the base station for the terminal device to transmit a reference signal over the secondary carrier and determining a measurement gap. The measurement gap indicates a time interval for the terminal device to switch from the primary carrier to the secondary carrier for transmitting the reference signal to the base station over the secondary carrier and to switch back to the primary carrier. The method also comprises transmitting the reference signal to the base station over the secondary carrier according to the measurement gap.

In one embodiment, the method may further comprise receiving a configuration message from the base station. The configuration message indicates at least one of the following: information for the measurement gap, a reference signal sequence to be transmitted, periodicity of the transmission of the reference signal, resource reserved for the transmission of the reference signal in the secondary carrier, and a time offset between uplink synchronization for the primary carrier and uplink synchronization for the secondary carrier. In another embodiment, the information for the measurement gap may include a parameter selected from a predefined set of parameters for the measurement gap.

In one embodiment, said determining the measurement gap may be based on at least one of: a determination as to whether the primary carrier and the secondary carrier are in a same frequency band, a predefined configuration of the measurement gap, and a configuration message from the base station.

In another embodiment, the terminal device may be configured with a further secondary carrier and receive a trigger from the base station to transmit the reference signal over the secondary carrier and the further secondary carrier sequentially according to the measurement gap.

In still another embodiment, the method may further comprise receiving an uplink synchronization indication from the base station which indicates whether uplink synchronization of the secondary carrier is obtainable from uplink synchronization of the primary carrier. In this embodiment, transmitting the reference signal to the base station over the secondary carrier may be performed by obtaining uplink synchronization of the secondary carrier according to the uplink synchronization indication and transmitting the reference signal to the base station over the secondary carrier based on the obtained uplink synchronization of the secondary carrier. In one embodiment, said receiving an uplink synchronization indication from the base station may comprise detecting a signal for triggering a random access procedure of the terminal device from the base station, and obtaining the uplink synchronization indication based on a result of the detection.

In some embodiments, the wireless communication system may be a TDD system. The reference signal may be transmitted to the base station for downlink channel estimation.

In a third aspect of the disclosure, there is provided an apparatus in a base station for communicating with a terminal device in a wireless communication system. The terminal device is configured with at least a primary carrier and a secondary carrier for carrier aggregation. The apparatus comprises a gap determination unit, a reference signal triggering unit, and a channel estimation unit. The gap determination unit is configured to determine a measurement gap. The measurement gap indicates a time interval for the terminal device to switch from the primary carrier to the secondary carrier for transmitting a reference signal to the base station over the secondary carrier and to switch back to the primary carrier. The reference signal triggering unit is configured to trigger the terminal device to transmit the reference signal over the secondary carrier according to the measurement gap. The channel estimation unit is configured to obtain a channel estimation based on the reference signal received from the terminal device during the measurement gap.

In a fourth aspect of the disclosure, there is provided an apparatus in a terminal device for communicating with a base station in a wireless communication system. The terminal device is configured with at least a primary carrier and a secondary carrier for carrier aggregation. The apparatus comprises a first receiving unit, a measurement gap determination unit, and a transmitting unit. The first receiving unit is configured to receive a trigger from the base station for the terminal device to transmit a reference signal over the secondary carrier. The measurement gap determination unit is configured to determine a measurement gap. The measurement gap indicates a time interval for the terminal device to switch from the primary carrier to the secondary carrier for transmitting the reference signal to the base station over the secondary carrier and to switch back to the primary carrier. The transmitting unit is configured to transmit the reference signal to the base station over the secondary carrier according to the measurement gap.

In a fifth aspect of the disclosure, there is provided an apparatus in a base station for communicating with a terminal device in a wireless communication system. The terminal device is configured with at least a primary carrier and a secondary carrier for carrier aggregation. The apparatus comprises a processor and a memory. The memory contains instructions executable by the processor whereby said apparatus is operative to perform method according the first aspect of the present disclosure.

In a sixth aspect of the disclosure, there is provided an apparatus in a terminal device for communicating with a base station in a wireless communication system. The terminal device is configured with at least a primary carrier and a secondary carrier for carrier aggregation. The apparatus comprises a processor and a memory. The memory contains instructions executable by the processor whereby said apparatus is operative to perform method according the second aspect of the present disclosure.

In a seventh aspect of the disclosure, there is provided an apparatus in a base station for communicating with a terminal device in a wireless communication system. The terminal device is configured with at least a primary carrier and a secondary carrier for carrier aggregation. The apparatus comprises processing means adapted to perform method according the first aspect of the present disclosure.

In an eighth aspect of the disclosure, there is provided an apparatus in a terminal device for communicating with a base station in a wireless communication system. The terminal device is configured with at least a primary carrier and a secondary carrier for carrier aggregation. The apparatus comprises processing means adapted to perform method according the second aspect of the present disclosure.

In a ninth aspect of the disclosure, there is provided a computer program, comprising instructions which, when executed on at least one processor, cause the at least one processor to carry out the method according to the first aspect of the present disclosure.

In a tenth aspect of the disclosure, there is provided a computer program, comprising instructions which, when executed on at least one processor, cause the at least one processor to carry out the method according to the second aspect of the present disclosure.

According to the various aspects and some embodiments as mentioned above, reference signal transmission from a secondary carrier may be enabled. In some embodiments, impact to uplink performance of the primary carrier can be minimized.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
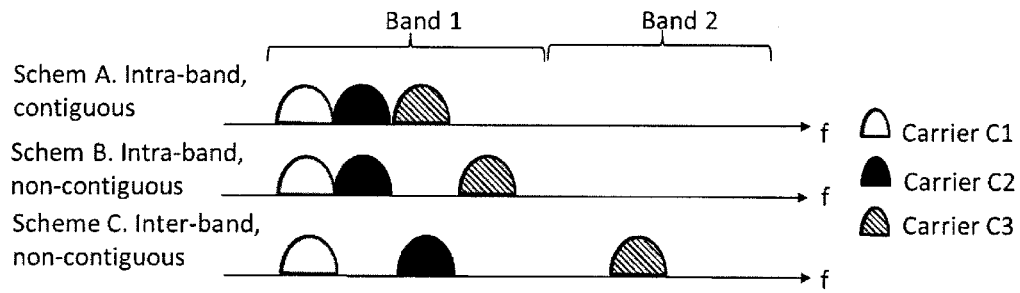
FIG. 1 illustrates a schematic diagram illustrating different carrier aggregation scenarios.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. For example, the term "terminal device" used herein may refer to any user terminal or UE having wireless communication capabilities, including but not limited to, mobile phones, cellular phones, smart phones, or personal digital assistants (PDAs), portable computers, image capture terminal devices such as digital cameras, gaming terminal devices, music storage and playback appliances, wearable terminal devices, vehicle-mounted wireless terminal devices and the like. In the following description, the terms "terminal device", "terminal", "user equipment" and "UE" may be used interchangeably. Similarly, the term "base station" may refer to a base station (BS), a node B (NodeB or NB), an evolved NodeB (eNodeB or eNB), a Remote Radio Unit (RRU), a radio head (RH), a remote radio head (RRH), a TRP (Transmission Reception Point), AN (access Node), a relay node (RN), or a low power node (LPN) such as a femto, a pico, an access point (AP) and so forth, depending on the applied terminology and technology.

As mentioned above, there are several different carrier aggregation scenarios, as shown in FIG. 1. Intra-band contiguous carrier aggregation (e.g., scheme "A" as shown in FIG. 1) is the easiest way to arrange carrier aggregation, where contiguous component carriers within the same operating frequency band (as defined for LTE) are aggregated. This might not always be possible, however, due to operator's frequency allocation scenarios. Therefore, non-contiguous carrier aggregation is also an important deployment. As shown in FIG. 1, for non-contiguous carrier aggregation, the component carriers being aggregated could either be intra-band or inter-band. In the intra-band non-contiguous carrier aggregation scenario (e.g., scheme B shown in FIG. 1), the aggregated component carriers belong to a same operating frequency band (e.g., band 1 shown in FIG. 1), but with a gap (or gaps) in between, and in the inter-band carrier aggregation scenario (e.g., scheme C as shown in FIG. 1), the component carriers belong to different operating frequency bands (e.g., band 1 and band 2 shown in FIG. 1).

Currently, for a wireless communication system with CA, the network side (e.g., an LTE eNB) can receive and transmit on N>1 component carriers, while terminal devices (e.g., UEs) can receive on M>1 component carriers, but transmit on only one of the M carriers due to a power amplifier (PA) limitation. One typical scenario is that a UE transmits uplink signals only on a primary carrier (also referred to as Primary cell, Pcell, or Pcell carrier hereafter) and receives downlink signals on selected carriers, which may include the primary carrier and one or more secondary carriers (also referred to as Secondary cell, Scell, or Scell carrier hereafter) to boost the downlink capacity. For secondary carriers without uplink transmission from the UE, corresponding channel state information (CSI) can hardly be obtained by the network side. Under such condition, reciprocity-based multiple antenna techniques cannot be exploited for corresponding downlink transmission. Also, it is difficult for the network side to change the Pcell for the UE (i.e., reconfigure a Scell to be a new Pcell), since the CSI for the Scells are unavailable.

In order to enable reference signal transmission on a secondary carrier in uplink, thereby enabling reciprocity-based multiple antenna techniques for downlink transmission, and/or, Pcell reconfiguration or Scell scheduling for uplink, methods, apparatuses and computer programs are provided herein. For illustrative purposes, several embodiments of the present disclosure will be described in the context of a 5G system. Those skilled in the art will appreciate, however, that the concept and principle of the several embodiments of the present disclosure may be more generally applicable to other wireless networks, for example a Wireless Local Area Network (WLAN) network or an ad-hoc network.

Figure 2:
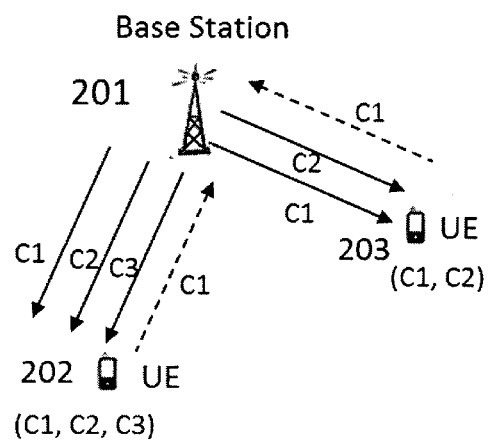
FIG. 2 illustrates an example wireless communication system 200 in which embodiments of the disclosure may be implemented.

FIG. 2 illustrates an example wireless communication system 200 in which embodiments of the disclosure may be implemented. As shown in FIG. 2, the wireless communication system 200 may comprise one or more base stations 201, which may be in the form of an eNB. It will be appreciated that the base station 201 could also be in the form of Node B's, BTSs (Base Transceiver Stations), BS (Base Station) and/or BSSs (Base Station Subsystems), and the like. The base station 201 provides radio connectivity to a plurality of UEs (e.g., UEs 202-203) within its coverage. Each UE may be served with carrier aggregation, i.e., multiple carriers including a primary carrier and one or more secondary carriers can be configured for the UE for downlink reception and/or uplink transmission. For example, UE 202 in FIG. 2 is illustrated as being configured with a primary carrier C1, and two secondary carriers C2 and C3 for both downlink and uplink. In this example, the example wireless communication system 200 is assumed as a TDD system, where both the downlink and uplink operate on the same frequency. It would be appreciated that embodiments of the disclosure are not limited to a TDD system. By configuring different frequency carriers for downlink and uplink, the example of FIG. 2 can be extended to a frequency division duplex (FDD) system.

The UE 202 or 203 can receive downlink transmission from the eNB 201 over multiple carriers simultaneously. Typically, however, the UE only transmits uplink data to the eNB via a single carrier at a time, and the single carrier may be the primary carrier (e.g., C1). For the secondary carriers without uplink transmission (e.g, C2 and C3), uplink channel state information is not available at the eNB side. It means reciprocity-based multiple antenna technique (e.g., beam-forming, BF) cannot be utilized for carriers C2 and C3. Furthermore, in such case, the eNB has no knowledge of configuring which secondary carrier as a new Pcell or configuring which carrier for uplink transmission, if the load status or channel condition of the current Pcell is not satisfying.

Reference signal (RS) transmission from a secondary carrier may help to solve the above problem. In a conventional approach, the transmission of sounding reference signals (SRS) from a secondary cell in a secondary cell group is proposed, where a UE would firstly transmit a random access preamble in the Scell after receiving a control command from a base station. Then, the base station feeds back a random access response (RAR) including a timing advance (TA) command to the UE. After that, the UE would transmit one or more SRSs based on the TA command.

However, in this conventional approach, implementation restrictions at the UE side have not been considered. Actually, due to a PA limitation, the UE cannot transmit simultaneously over multiple carriers, i.e., when the UE transmits a reference signal in a Scell, any transmission from the Pcell or other Scells should be avoided. On the other hand, if there is scheduled uplink transmission in the Pcell, the UE will not be able to transmit a reference signal over the Scell at the same time. It means that a switching between carriers is unavoidable. The inventor of the present disclosure has realized that a switching time needs to be reserved when the UE switches from one carrier to another carrier in the uplink. If the switching time and/or transmission time in the Scells are long, there would be performance degradation for both Pcell and Scells. Furthermore, the switching may degrade communication performance of both the Pcell and the Scell(s) if the eNB is unaware of the occurrence of the switching.

In order to facilitate reference signal transmission from a secondary carrier by taking into consideration the implementation restrictions, e.g., the PA limitation at the UE side, thereby enabling CSI measurement of the secondary carrier, and reducing/minimizing performance degradation of the primary carrier at the same time, methods, apparatuses and computer programs have been proposed herein.

Figure 3A:
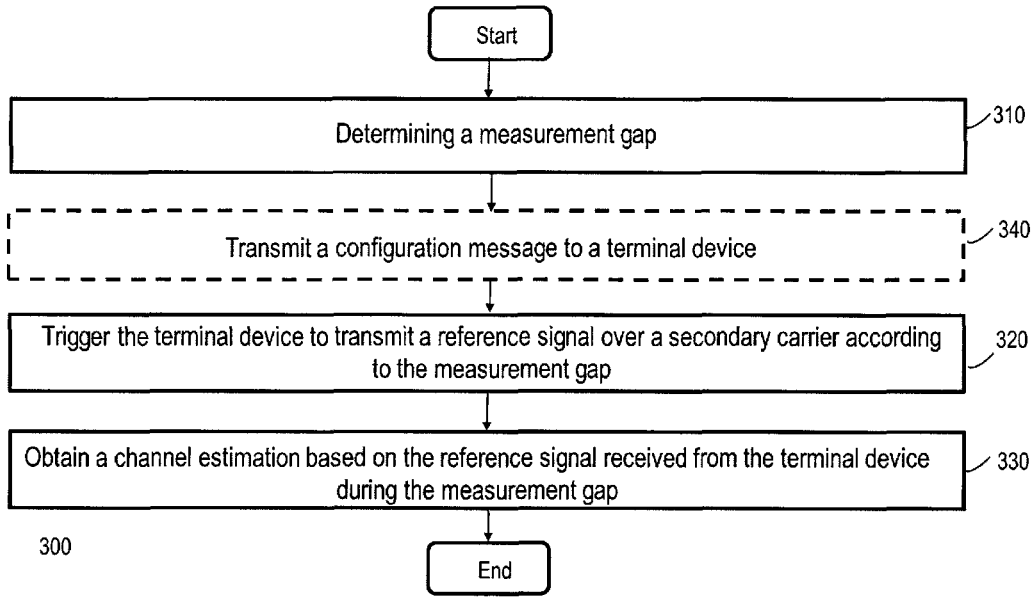
FIGS. 3a-3b illustrate flowcharts of a method at least partly implemented at a base station according to an embodiment of the present disclosure.
Figure 3B:
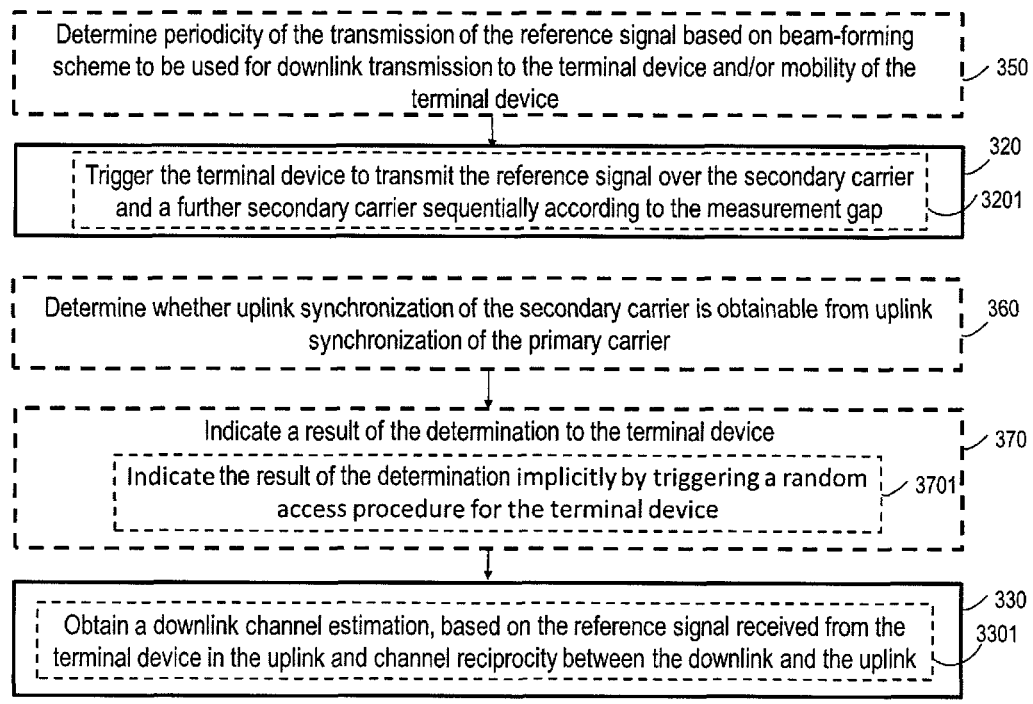

Reference is now made to FIGS. 3a-3b, which show flowcharts of a method 300 in a wireless communication system (e.g., the wireless system 200 as shown in FIG. 2), for communicating with a terminal device (e.g., UE 202 or 203 as shown in FIG. 2) configured with at least a primary carrier (e.g., C1) and a secondary carrier (e.g., C2 and/or C3) for carrier aggregation, according to an embodiment of the present disclosure. In one embodiment, the method 300 may be at least partly implemented at a base station, for example the base station 201 as shown in FIG. 2.

As illustrated in FIG. 3a, the method 300 comprises determining a measurement gap at block 310. The measurement gap indicates a time interval for the terminal device to switch from the primary carrier to the secondary carrier for transmitting a reference signal to the base station over the secondary carrier and to switch back to the primary carrier. At block 320, the terminal device is triggered to transmit the reference signal over the secondary carrier according to the measurement gap. At block 330, a channel estimation is obtained based on the reference signal received from the terminal device during the measurement gap.

With the method 300, a base station (e.g., base station 201) is enabled to request and control reference signal transmission on a secondary carrier (e.g., carrier C2 or C3) from a terminal device (e.g., UE 202 or 203), thereby obtaining CSI of the secondary carrier. Furthermore, since transmission of the reference signal is restricted to the measurement gap known to the base station, negative impact to the primary carrier may be minimized.

In one embodiment, examples of the reference signal include, but are not limited to, a SRS signal. Actually, any reference signals suitable for providing CSI may be used.

In one embodiment, the measurement gap can be defined as a time interval between a time point when the terminal device starts switching to the secondary carrier in uplink and a time point when the UE completes its switching back to the primary carrier in uplink.

In one embodiment, at block 310, the base station may determine the measurement gap based on a determination as to whether the primary carrier (e.g., C1) and the secondary carrier (e.g., C2, C3) are in a same frequency band. For example, in the case of intra-band CA (e.g., scheme A as shown in FIG. 1), a measurement gap smaller than that used in an inter-band CA scenario (e.g., scheme C as shown in FIG. 1) may be determined.

Alternatively, or in addition, in one embodiment, the base station may determine the measurement gap based on a predefined configuration for the measurement gap. For example, the predefined configuration for the measurement gap may be a statistic value or an empirical value predefined for the duration of the measurement gap. In still another embodiment, the predefined configuration may include a set of parameter values for the duration of the measurement gap and a predefined rule for selecting among the set of parameter values. For example, the predefined rule may use a frequency gap between the primary carrier and the secondary carrier as an input. In such a case, at block 310, the base station may determine the measurement gap based on both the predefined configuration and whether the primary carrier (e.g., C1) and the secondary carrier (e.g., C2, C3) are in the same frequency band. It provides more flexibility for measurement gap configuration. It shall be appreciated that embodiments of the present disclosure are neither limited to any specific predefined rule for selecting among the set of parameter values for the duration of the measurement gap, nor limited to any specific predefined configuration for the measurement gap.

In one embodiment, a set of possible parameter values of maximum allowed measurement gap period can be predefined in a specification (e.g., 3GPP specification), and a base station may select a proper value from the set at block 310. The measurement gap may be selected depending on whether the primary carrier and the secondary carrier are in the same band.

Alternatively, or in addition, in one embodiment, at block 310, the measurement gap may be determined be the determination of a start and/or end time point for the measurement gap.

In one embodiment, a principle for determining the measurement gap may be predefined, such that the determination operation (i.e., block 310) can be implemented at the base station side and the terminal device side separately following that principle. In such a case, the base station and the terminal device can obtain a common knowledge of the determined measurement gap without explicit signaling.

Alternatively, the base station may be responsible for determining the measurement gap at block 310 and then transmitting a configuration message to the terminal device at block 340, with the configuration message indicating information for the measurement gap. In one embodiment, the indicated information for the measurement gap at block 340 may be a parameter selected from a predefined set of parameters for the measurement gap. Each of the predefined set of parameters may indicate at least one of a start time position, an end time position, a length of the duration of the measurement gap, and periodicity of the measurement gap.

In one embodiment, at block 340, the base station may only indicate a part of the information for determining the measurement gap, and the other part of the information may be predefined or known by the terminal device implicitly.

Optionally, a reference signal configuration for the secondary carrier or, a part of the reference signal configuration can be pre-configured before the reference signal is triggered at block 320. The reference signal may be an SRS, and the reference signal configuration may include SRS sequence selection, a time-frequency resource reserved for the SRS, a SRS transmission period, and a length of the measurement gap, etc.

Alternatively, or in addition, in one embodiment, the configuration message transmitted by the base station at block 340 may indicate a configuration for the reference signal. For example, the configuration message may indicate at least one of a reference signal sequence to be transmitted, periodicity of the transmission of the reference signal and a resource reserved for the transmission of the reference signal over the secondary carrier.

As one alternative, the configuration message may be transmitted at block 320 when triggering the reference signal transmission.

As shown in FIG. 3*b*, in some embodiment, the base station may determine periodicity of the transmission of the reference signal at block 350, for example based on a beam-forming scheme to be used for downlink transmission to the terminal device (202, 203) and/or mobility of the terminal device (202, 203). For instance, the reference signal is triggered to be transmitted periodically and the period may depend on a requirement for the reciprocity. For example, for a GoB-based downlink beamforming scheme, the SRS transmission may be less frequent (i.e., the period may be longer), while for an EBB (or similar)-based downlink beamforming scheme, the SRS transmission may be more frequent (i.e., the period may be shorter). In another embodiment, for high speed UEs, the SRS transmission may be more frequent, while for low speed UEs, the SRS transmission may be less frequent. It enables flexible reference signal configuration, thereby resulting in more efficient reference signal transmission.

Alternatively, in some embodiments, the reference signal transmission triggered at block 320 can be determined as aperiodic at block 350.

In some embodiments, the terminal device may be configured with a further secondary carrier (e.g., C2 or C3). In one of these embodiments, block 320 may comprise a sub-block 3201, where the base station triggers the terminal device to transmit the reference signal over the secondary carrier and the further secondary carrier sequentially according to the measurement gap. For example, the base station may trigger the terminal device to switch from the primary carrier to the secondary carrier, transmit the reference signal to the base station over the secondary carrier, and then switch to the further secondary carrier, transmit the reference signal over the further secondary carrier and switch back to the primary carrier within the measurement gap. As another example, the base station may trigger the terminal device to switch from the primary carrier to the secondary carrier, transmit the reference signal to the base station over the secondary carrier and switch back to the primary carrier within the measurement gap, and then switch from the primary carrier to the further secondary carrier, transmit the reference signal to the base station over the further secondary carrier and switch back to the primary carrier within next measurement gap. That is, the base station may trigger the terminal device to transmit over the secondary carrier and the further secondary carrier sequentially in a single measurement gap, or in two separate measurement gaps.

In one embodiment, the triggering at block 3201 may be implemented by sending a single trigger message to the terminal device. In another embodiment, the triggering may be implemented by sending two separate trigger messages to the terminal device.

In another embodiment, the terminal device may be configured with N>1 secondary carriers. In such an embodiment, at block 320, the base station may trigger the terminal device to transmit the reference signal over only a subset of the N secondary carriers sequentially according to the measurement gap. It would be understood that transmitting the reference signal over the subset of the N secondary carriers sequentially may include switching among the subset of secondary carriers.

In some embodiments, in the case that the base station triggers the terminal device to transmit over more than one secondary carrier sequentially at block 320, or 3201, a transmission order of the reference signals (RSs) over the more than one secondary carrier (e.g., the RS should be transmitted in which carrier first) may be predefined. Alternatively, in some other embodiments, the transmission order may be indicated via explicit signaling, for example, at block 320.

Optionally, in one embodiment of the method 300, as shown in FIG. 3*b*, it is possible to determine, at block 360, whether uplink synchronization of the secondary carrier is obtainable from uplink synchronization of the primary carrier. A result of the determination may be sent to the terminal device at block 370. In another embodiment, at block 360, the base station may determine whether the uplink synchronization of the secondary carrier can be obtained from uplink synchronization of the primary carrier based on a determination as to whether the primary carrier and the secondary carrier are co-located. For example, in some carrier aggregation scenarios, all the aggregated component carriers are from the same site. In this case, the base station may determine at block 360 that the Pcell and the Scell are synchronized and the uplink synchronization obtained from the Pcell is also available to the Scell. Then at block 370, the result of the determination may be indicated to the terminal device, such that when the terminal device sends the SRS in the Scell, it may reuse the uplink timing of the primary cell without initiating a RA procedure on the secondary cell. For example, the terminal device may use uplink timing of the primary carrier plus a time offset as the uplink timing of the secondary carrier. That is, unnecessary RA procedure can be avoided. Thereby the resource and power can be saved and the time delay is reduced.

In one embodiment, the block 370 may comprise a sub-block 3701. At block 3701, in response to determining at block 360 that uplink synchronization of the secondary carrier is unobtainable from the uplink synchronization of the primary carrier, the base station may implicitly indicate the result of the determination to the terminal device by triggering a random access procedure for the terminal device. In another embodiment, the base station may determine at block 360 that uplink timing for the secondary carrier is obtainable from the uplink timing of the primary carrier, for example, if the uplink timing for the secondary carrier equals to uplink timing of the primary carrier plus a time offset. In this case, the base station does not trigger a RA procedure for the secondary carrier at block 3701, which will be interpreted by the terminal device as an implicit uplink synchronization indication which indicates that the uplink synchronization of the secondary carrier is obtainable from the uplink synchronization of the primary carrier.

In one embodiment, the time offset between the uplink synchronization for the primary carrier and the uplink synchronization for the secondary carrier may be indicated at block 370 or 3701. In another embodiment, the time offset may be predefined or implicitly known to the terminal device.

Alternatively, in another embodiment, the result of the determination performed at block 360 may be indicated to the terminal device via the configuration message transmitted to the terminal device at block 340. For example, the configuration message transmitted at block 340 may comprise at least one of the following: information as to whether uplink synchronization of the secondary carrier is obtainable from uplink synchronization of the primary carrier, and a time offset between uplink synchronization for the primary carrier and uplink synchronization for the secondary carrier.

In one embodiment, the wireless communication system (e.g., the system 200 as shown in FIG. 2) to which method 300 is applied is a TDD system. In this embodiment, block 330 may comprise a sub-block 3301 where the base station obtains a downlink channel estimation based on the reference signal received from the terminal device in the uplink and channel reciprocity between the downlink and the uplink of the wireless communication system. It would be appreciated that in another embodiment, method 300 may be applied to a FDD system, and at block 330, the base station may obtain an uplink channel estimation based on the reference signal received from the terminal device during the measurement gap. Embodiments of the present disclosure are not limited to any specific use of the reference signal obtained by the base station.

Figure 4A:
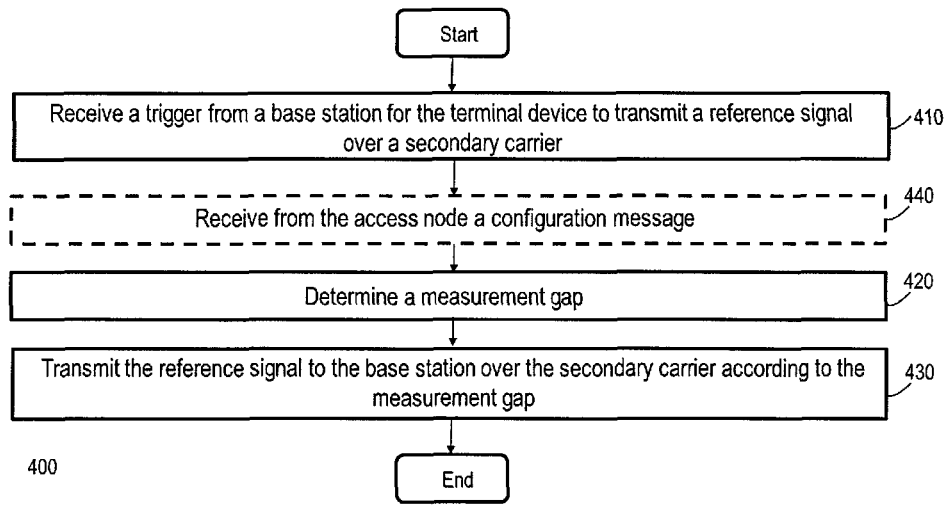
FIGS. 4a-4c illustrate flowcharts of a method implemented in a terminal device according to an embodiment of the present disclosure.
Figure 4B:
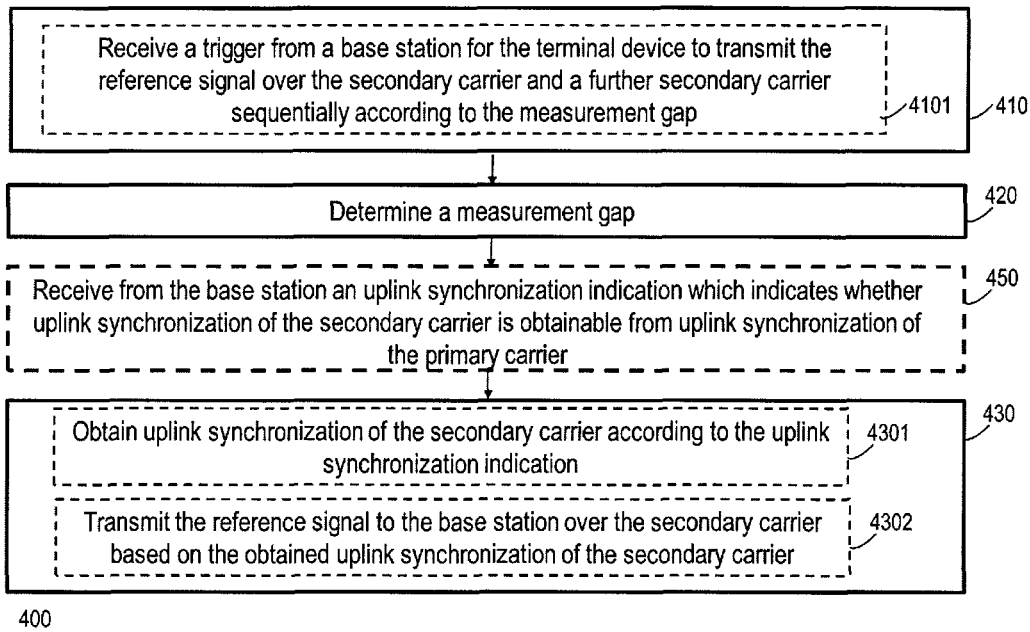
Figure 4C:
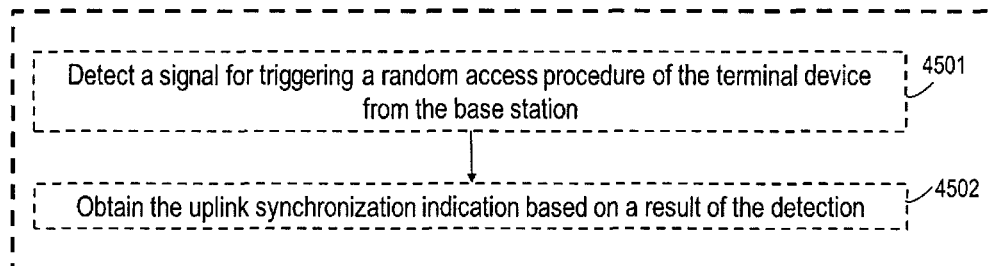

Reference is now made to FIGS. 4a-4c, which show flowcharts of a method 400 implemented in a terminal device (e.g., UE 202 or 203 shown in FIG. 2) for communicating with a base station (e.g., the base station 201 shown in FIG. 2) in a wireless communication system (e.g., system 200 shown in FIG. 2) according to various embodiments of the present disclosure. The terminal device is configured with a primary carrier (e.g., carrier C1) and a secondary carrier (e.g., carrier C2 and/or C3) for carrier aggregation.

As illustrated in FIG. 4a, at block 410, a trigger is received from the base station for the terminal device to transmit a reference signal over the secondary carrier (C2, C3). At block 420, a measurement gap is indicated. As described above, the measurement gap indicates a time interval for the terminal device to switch from the primary carrier to the secondary carrier for transmitting the reference signal to the base station over the secondary carrier and to switch back to the primary carrier. Then, at block 430, the reference signal is transmitted to the base station over the secondary carrier according to the measurement gap.

In one embodiment, the trigger received by the terminal device at block 410 may be the one transmitted by the base station at block 320 according to method 300 as described with reference to FIGS. 3a-3b. Therefore, relevant descriptions with respect to the reference signal and the measurement gap provided with reference to method 300 and FIGS. 3a-3b are also applicable here.

In another embodiment, the method 400 may further comprise receiving a configuration message from the base station at block 440, and the configuration message may indicate information for the measurement gap. The configuration message may be the one transmitted by the base station at block 340 according to method 300, and therefore, descriptions with respect to the configuration message also apply here and will not be repeated. For example, the information for the measurement gap that may be included in the configuration message may comprise a parameter selected from a predefined set of parameters for the measurement gap. Each parameter of the predefined set of parameters for the measurement gap may indicate at least one of duration, periodicity, a start time position and an end time position of the measurement gap.

In still another embodiment, the configuration message may include a configuration for the reference signal rather than information for the measurement gap. In a further embodiment, the configuration message may include both the information for the measurement gap and the configuration for the reference signal. The configuration for the reference signal may include at least one of a reference signal sequence to be transmitted, periodicity of the transmission of the reference signal and resource reserved for the transmission of the reference signal over the secondary carrier.

In one embodiment, at block 420, the terminal device may determine the measurement gap, based on at least one of: a determination as to whether the primary carrier and the secondary carrier are in the same frequency band, a predefined configuration of the measurement gap, and the configuration message from the base station (e.g., the configuration message received at block 440).

In one embodiment, the terminal device may be configured with the primary carrier, the secondary carrier and a further secondary carrier (e.g., the terminal devices are configured with at least two secondary carriers C2 and C3) for carrier aggregation. In this embodiment, block 410 may comprise a sub-block 4101, where the terminal device receives a trigger from the base station for the terminal device to transmit the reference signal over the secondary carriers and the further secondary carrier sequentially according to the measurement gap, as shown in FIG. 4b.

In one embodiment, transmitting the reference signal over the secondary carriers and the further secondary carrier sequentially according to the measurement gap means that the terminal device needs to complete switching to the secondary carrier from the primary carrier, sending the reference signals over the secondary carrier, switching to the further secondary carrier, transmitting the reference signal over the further secondary carrier and switching back to the primary carrier within a measurement gap. In another embodiment, the trigger received by the terminal device at sub-block 4101 may trigger the terminal device to switch from the primary carrier to the secondary carrier, transmit the reference signal to the base station over the secondary carrier and switch back to the primary carrier within the measurement gap, and then switch from the primary carrier to the further secondary carrier, transmit the reference signal to the base station over the further secondary carrier and switch back to the primary carrier within next measurement gap. That is, the terminal device may be triggered to transmit over the secondary carrier and the further secondary carrier sequentially in a single measurement gap, or two separate measurement gaps.

In one embodiment, the trigger received at sub-block 4101 may include a single trigger message, and in another embodiment, the trigger may include two separate trigger messages for the secondary carrier and the further secondary carrier respectively.

In another embodiment, the terminal device may be configured with more than one (i.e. N>1) secondary carriers, and the trigger received at block 410 may trigger the terminal device to transmit the reference signal over only a subset of the N secondary carriers sequentially according to the measurement gap. It would be understood that transmitting the reference signal over the subset of the N secondary carriers sequentially may include switching among the subset of secondary carriers.

In some embodiments, in case the terminal device is triggered to transmit over more than one secondary carrier sequentially at block 410, or 4101, a transmission order of the reference signals over the more than one secondary carrier may be predefined. Alternatively, in some other embodiments, the transmission order can be indicated via an explicit signaling (e.g., an indication included in the trigger message received at block 410).

Optionally, in one embodiment, the method may further comprise receiving an uplink synchronization indication from the base station at block 450. The uplink synchronization indication may indicate how to derive uplink synchronization of the secondary carrier. By way of example, the uplink synchronization indication may indicate whether uplink synchronization of the secondary carrier is obtainable from uplink synchronization of the primary carrier, and/or a time offset between uplink synchronization for the primary carrier and uplink synchronization for the secondary carrier. In another embodiment, the time offset may be predefined, or can be implicitly provided to the terminal device.

In another embodiment, the uplink synchronization indication received at block 450 may be implicit signaling. For example, the operations of block 450 may comprise detecting a signal from the base station for triggering a random access procedure of the terminal device at sub-block 4501, and then obtaining the uplink synchronization indication based on a result of the detection at sub-block 4502, as shown in FIG. 4c. In one embodiment, if no trigger for a RA procedure is detected at sub-block 4501, then at sub-block 4502, the terminal device may interpret it as an uplink synchronization indication which indicates that the uplink synchronization of the secondary carrier is obtainable from uplink synchronization of the primary carrier. For instance, uplink timing of the secondary carrier may be determined as uplink timing of the primary carrier plus a time offset. In another embodiment, if a trigger for RA procedure is detected at sub-block 4501, then at sub-block 4502, the terminal device may interpret it as an uplink synchronization indication which indicates that the uplink synchronization of the secondary carrier is unobtainable from uplink synchronization of the primary carrier, and the uplink synchronization of the secondary carrier should be obtained via a Random Access Channel (RACH) procedure on the secondary carrier.

Alternatively, in one embodiment, the uplink synchronization indication may be included in the configuration message received at block 440. For example, the configuration message received at block 440 may comprise information as to whether uplink synchronization of the secondary carrier is obtainable from uplink synchronization of the primary carrier, and/or, a time offset between uplink synchronization for the primary carrier and uplink synchronization for the secondary carrier.

In one embodiment, the block 430 may comprise sub-blocks 4301 and 4302. At sub-block 4301, the terminal device may obtain uplink synchronization of the secondary carrier according to the uplink synchronization indication obtained at block 450 or 440. At sub-block 4302, where the terminal device transmits the reference signal to the base station over the secondary carrier based on the obtained uplink synchronization of the secondary carrier.

Similar to method 300, the method 400 may be implemented in a TDD system, and the reference signal transmitted by the terminal device at block 430 to the base station in uplink can be used for downlink channel estimation at the base station side. However, embodiments of the present disclosure are not limited to such use cases. In another embodiment, the reference signal may also be used for uplink channel estimation.

Figure 5:
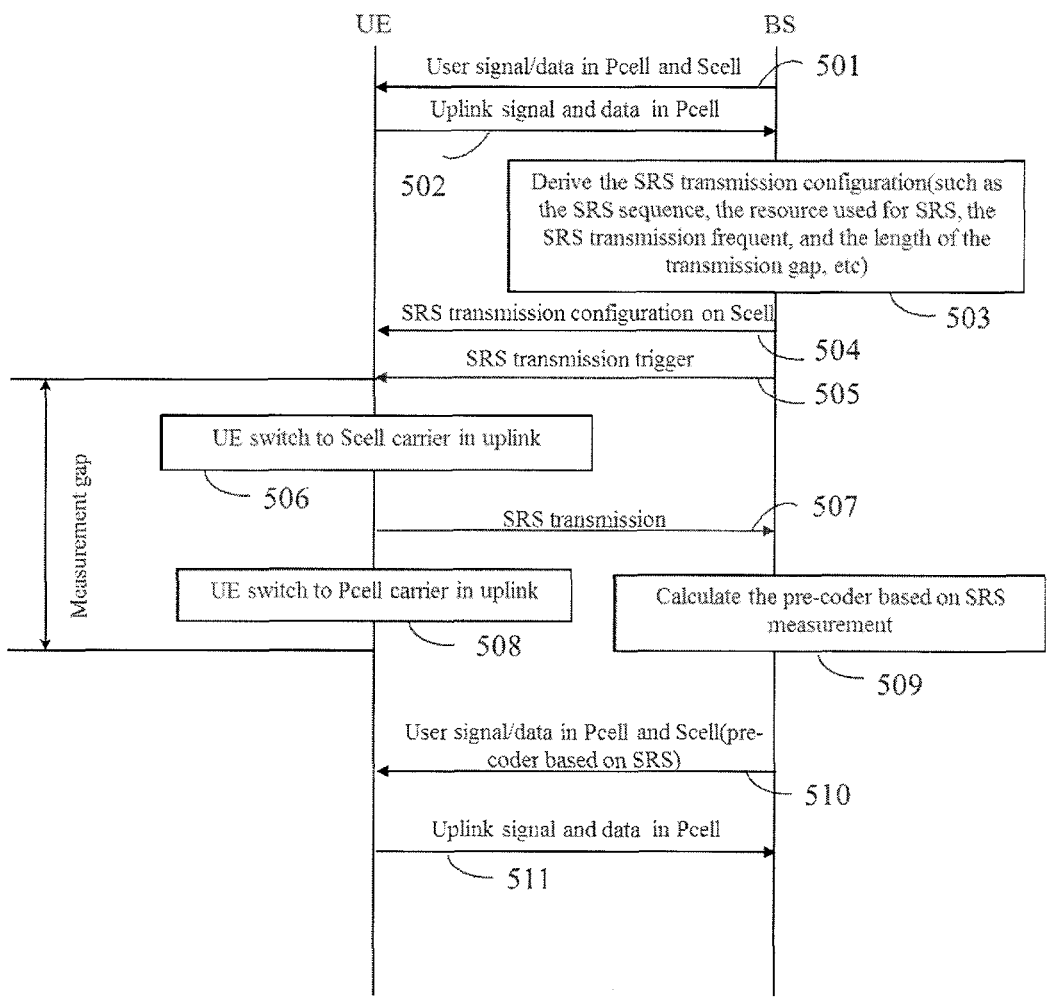
FIG. 5 shows an example signaling flow between a base station and a terminal device according to an embodiment of the present disclosure.

FIG. 5 shows an example signaling flow between a base station (which is shown as BS in FIG. 5, and may be the base station 201 as shown in FIG. 1, for example) and a terminal device (which is shown as UE in FIG. 5) according to an embodiment of the present disclosure. As shown in FIG. 5, the base station can transmit downlink signal or data to the terminal device in both Pcell and Scell (501), while signal/data of the UE are transmitted to the base station over the carrier of the Pcell (520) only. When the base station needs a SRS in the Scell, it will trigger the UE to send the SRS (505). In some embodiments, the base station may determine configuration for the SRS transmission (503) and indicate (504) the configuration to the terminal device before triggering the SRS transmission, as shown in FIG. 5. In another embodiment, the operation of 504 may be omitted and the configuration for the SRS transmission may be predefined, or indicated together with the trigger for SRS transmission at 505. After receiving a command for the SRS transmission in the Scell (e.g., at 505), the UE will switch from the Pcell carrier to the Scell carrier in the uplink (506), and transmit the SRS based on the SRS configuration (507). After the SRS transmission, the UE would switch back to the Pcell carrier in the uplink (508). Based on the measurement of the SRS in the Scell, the pre-coder, i.e., beamforming weights, may be obtained (509) for a following downlink transmission (510) in the Scell. After the measurement gap, the terminal device may be scheduled to transmit data/signal in the Pcell in the uplink (511).

Figure 6:
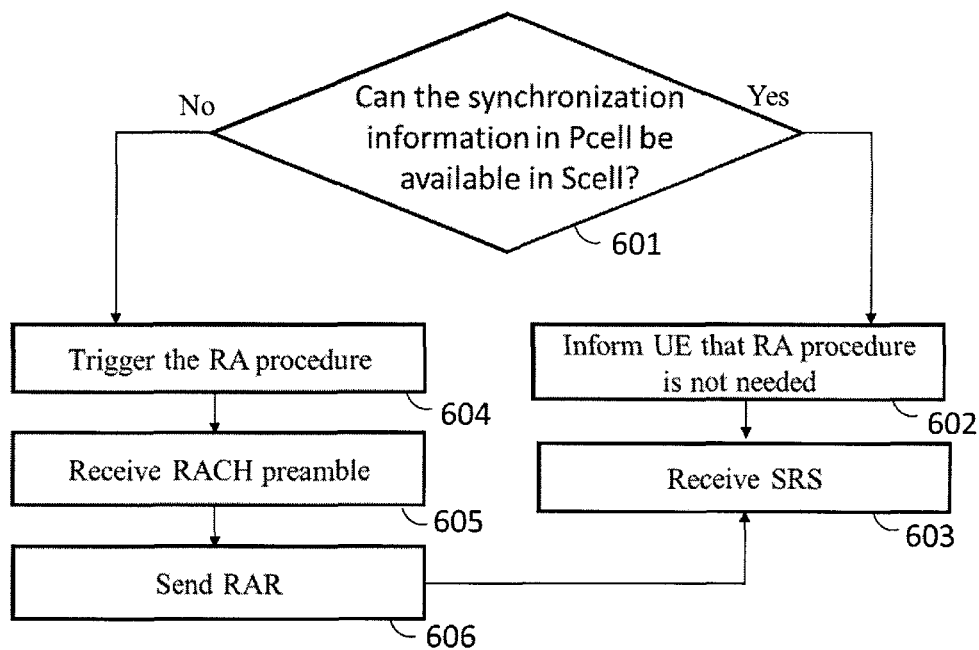
FIG. 6 illustrates an example flowchart of operations at a base station for facilitating uplink synchronization of a secondary carrier according to an embodiment of the present disclosure

FIG. 6 shows an example flow chart of operations at a base station for facilitating uplink synchronization of a secondary carrier according to an embodiment of the present disclosure. As shown in FIG. 6, the base station may determine at block 601 whether synchronization information in the Pcell is available for the Scell. In some carrier aggregation scenarios, all the carriers come from the same site, which means it is synchronized between the Pcell and Scell. In this case, the uplink synchronization obtained from the Pcell is also available for the Scell. The base station may inform the terminal device that a RA procedure is not needed at block 602. Then the terminal device may send a SRS by using uplink timing obtained based on the uplink timing of the Pcell directly without a RA procedure, and the base station can receive the SRS at block 603. If it is determined at block 601 that the uplink synchronization of the Pcell is not available in the Scell, the base station may trigger a RA procedure at block 604, receive a RACH preamble from the terminal device at block 605, and send a RAR at block 606 before receiving the SRS at block 603. The information sent by the base station at 602 or 604 may be used by the terminal device as an uplink synchronization indication, or used for obtaining an uplink synchronization indication, as described with reference to methods 300 and 400. With this embodiment, the unnecessary RACH procedure can be avoided.

Figure 7:
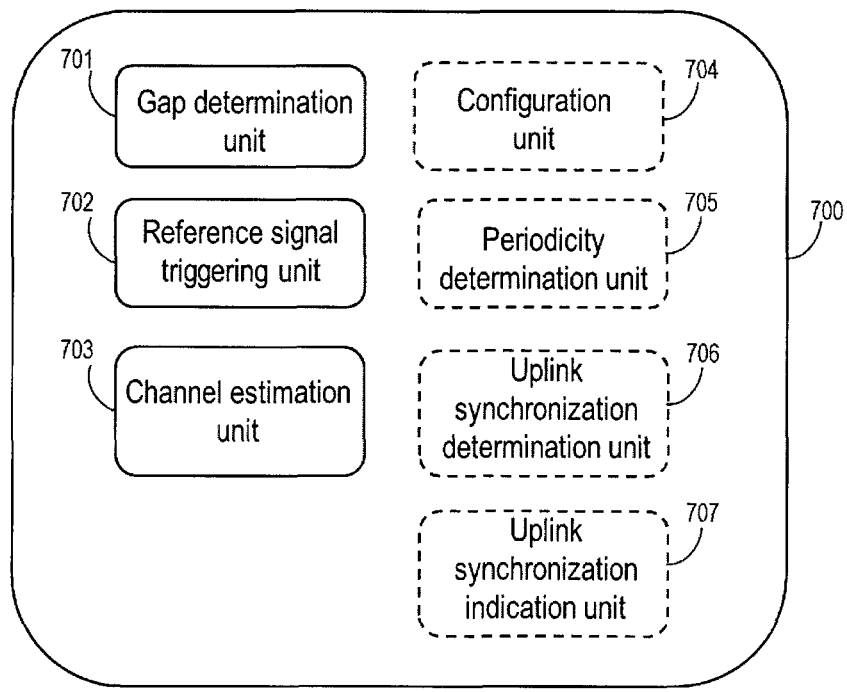
FIG. 7 illustrates a schematic block diagram of an apparatus 700 in a base station according to an embodiment of the present disclosure.

Reference is now made to FIG. 7, which illustrates a schematic block diagram of an apparatus 700 in a wireless communication system (e.g., the system 200 shown in FIG. 2) for communicating with a terminal device (e.g., UE 202 or 203 shown in FIG. 2). The terminal device is configured with at least a primary carrier (e.g., C1) and a secondary carrier (e.g., C2 and/or C3) for carrier aggregation. The apparatus may be at least partially implemented at a base station, e.g., the eNB 201 shown in FIG. 2. The apparatus 700 is operable to carry out the example method 300 as described with reference to FIGS. 3*a*-3*b* and possibly any other processes or methods. It is also to be understood that the method 300 is not necessarily carried out by the apparatus 700 completely. Some steps of the method 300 may be performed by one or more other entities.

As illustrated in FIG. 7, the apparatus 700 comprises a gap determination unit 701, a reference signal triggering unit 702, and a channel estimation unit 703. The gap determination unit 701 is configured to determine a measurement gap, which indicates a time interval for the terminal device to switch from the primary carrier to the secondary carrier for transmitting a reference signal to the base station over the secondary carrier and to switch back to the primary carrier. The reference signal triggering unit 702 is configured to trigger the terminal device to transmit the reference signal over the secondary carrier according to the measurement gap. The channel estimation unit 703 is configured to obtain a channel estimation based on the reference signal received from the terminal device during the measurement gap.

In one embodiment, units 701-703 can be configured to perform the operations of blocks 310-330 of method 300, respectively. Therefore, descriptions with respect to blocks 310-330 provided with reference to method 300 and FIGS. 3*a*-3*b* also apply here and will not be repeated.

Optionally, in another embodiment, the apparatus 700 may further comprise a configuration unit 704 that is configured to transmit a configuration message to the terminal device. The configuration message may indicate at least one of the following: information for the measurement gap; a reference signal sequence to be transmitted; periodicity of the transmission of the reference signal; a resource reserved for the transmission of the reference signal over the secondary carrier, and a time offset between uplink synchronization for the primary carrier and uplink synchronization for the secondary carrier. In some embodiments, the information for the measurement gap may comprise a parameter selected from a predefined set of parameters for the measurement gap. Descriptions with respect to the configuration message provided with reference to method 300 and 400 also apply here and will not be repeated.

In one embodiment, the gap determination unit 701 may be configured to determine the measurement gap based on at least one of: a determination as to whether the primary carrier and the secondary carrier are in a same frequency band, and a predefined configuration for the measurement gap.

In another embodiment, the apparatus 700 may further comprise a periodicity determination unit 705 that is configured to determine periodicity of the transmission of reference signal based on at least one of: beam-forming scheme to be used for downlink transmission to the terminal device; and mobility of the terminal device.

In still another embodiment, the terminal device may be configured with the primary carrier (e.g., C1), the secondary carrier and a further secondary carrier (i.e., the terminal device is configured with at least two secondary carriers, e.g., C2 and C3) for carrier aggregation. In this embodiment, the reference signal triggering unit 702 may be configured to trigger the terminal device to transmit the reference signal over the secondary carrier and the further secondary carrier sequentially according to the measurement gap. In one embodiment, the reference signal triggering unit 702 may be configured to trigger the terminal device to transmit the multiple reference signals sequentially in a single measurement gap. In another embodiment, the reference signal triggering unit 702 may be configured to trigger the terminal device to transmit the reference signals over the secondary carriers and the further secondary carrier sequentially by using two separate measurement gaps. In some embodiments, the reference signal triggering unit 702 may be configured to trigger the transmission of the reference signal over the secondary carriers and the further secondary carrier by sending a single trigger message to the terminal device. In some other embodiments, the reference signal triggering unit 702 may be configured to trigger the transmission of the reference signals over the secondary carriers and the further secondary carrier by sending two separate trigger messages to the terminal device.

Additionally or alternatively, in one embodiment, the apparatus 700 may comprise an uplink synchronization determination unit 706 that is configured to determine how to obtain uplink synchronization of the secondary carrier, e.g., whether the uplink synchronization of the secondary carrier is obtainable from uplink synchronization of the primary carrier. The apparatus 700 may further comprise an uplink synchronization indication unit 707 that is configured to indicate a result of the determination to the terminal device. In another embodiment, the uplink synchronization determination unit 706 may be configured to determine whether uplink synchronization of the secondary carrier can be obtained from uplink synchronization of the primary carrier based on whether the primary carrier and the secondary carrier are co-located. In a further embodiment, the uplink synchronization indication unit 707 may be configured to indicate the result of the determination to the terminal device implicitly by triggering a random access procedure for the terminal device in response to the determining by the uplink synchronization determination unit 706 that uplink synchronization of the secondary carrier is unobtainable from the uplink synchronization of the primary carrier.

Alternatively, in one embodiment, the uplink synchronization indication unit 707 may be configured to indicate the result of the determination to the terminal device by including the result into the configuration message transmitted by the configuration unit 740. For example, the configuration message may include information as to whether uplink synchronization of the secondary carrier is obtainable from uplink synchronization of the primary carrier, and/or, a time offset between uplink synchronization for the primary carrier and uplink synchronization for the secondary carrier. In such a case, the uplink synchronization indication unit 707 may serve as the configuration unit 740 or a part of it.

As described with method 300, in some embodiments, the wireless communication system may be a TDD system. The channel estimation unit 703 may be configured to obtain a downlink channel estimation, based on the reference signal received from the terminal device in the uplink and channel reciprocity between the downlink and the uplink of the wireless communication system.

Figure 8:
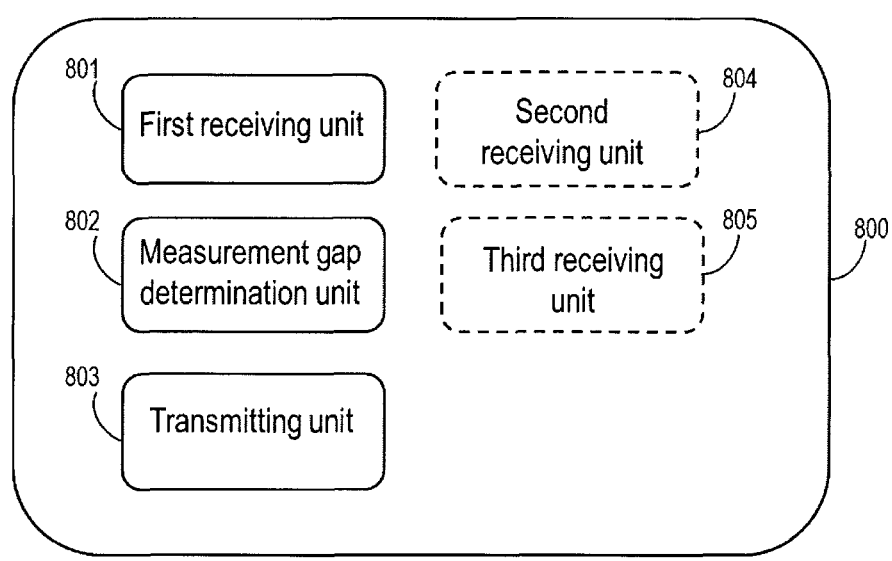
FIG. 8 illustrates a schematic block diagram of an apparatus 800 in a terminal device according to an embodiment of the present disclosure.

FIG. 8 illustrates a schematic block diagram of an apparatus 800 in a terminal device (e.g., UE 202 or 203 shown in FIG. 2) for communicating with a base station (e.g., eNB 201 shown in FIG. 2) in a wireless communication system (e.g., the wireless system 200 shown in FIG. 2). The terminal device is configured with at least a primary carrier (e.g., C1) and a secondary carrier (e.g., C2, and/or C3) for carrier aggregation. In some embodiments, the wireless communication system may be, but not limited to, a TDD system. The apparatus 800 is operable to carry out the example method 400 as described with reference to FIGS. 4a-4c and possibly any other processes or methods. It is to be understood that the method 400 is not necessarily carried out by the apparatus 800 completely. Some steps of the method 400 may be performed by one or more other entities.

Particularly, as illustrated in FIG. 8, the apparatus 800 comprises a first receiving unit 801, a measurement gap determination unit 802, and a transmitting unit 803. The first receiving unit 801 is configured to receive a trigger from the base station for the terminal device to transmit a reference signal over the secondary carrier. The measurement gap determination unit 802 is configured to determine a measurement gap which indicates a time interval for the terminal device to switch from the primary carrier to the secondary carrier for transmitting the reference signal to the base station over the secondary carrier and switch back to the primary carrier. The transmitting unit 803 is configured to transmit the reference signal to the base station over the secondary carrier according to the measurement gap.

In one embodiment, apparatus 800 may be configured to implement method 400, for example units 801-803 can be configured to perform the operations of blocks 410-430, respectively. Therefore, descriptions with respect to method 400 provided with reference to FIGS. 4a-4c also apply here and some details will not be repeated.

Optionally, in some embodiments, the apparatus 800 may further comprise a second receiving unit 804 that is configured to receive from the base station a configuration message which indicates at least one of: information for the measurement gap; a reference signal sequence to be transmitted; periodicity of the transmission of the reference signal; and resource reserved for the transmission of the reference signal over the secondary carrier. In one embodiment, the information for the measurement gap may comprise a parameter selected from a predefined set of parameters for the measurement gap. In some embodiments, the configuration message received by the second receiving unit 804 may be that transmitted by the base station at block 340 according to method 300 and/or received by a terminal device according to method 400. Therefore, descriptions regarding the configuration message provided with reference to methods 300 and 400 also apply here and details will not be repeated.

In one embodiment, the measurement gap determination unit 802 may be configured to determine the measurement gap based on at least one of: a determination as to whether the primary carrier and the secondary carrier are in a same frequency band, a predefined configuration of the measurement gap, and a configuration message from the base station (e.g., the configuration message received by the second receiving unit 804). For example, the measurement gap determination unit 802 may be configured to determine the measurement gap only based on the configuration message if available. In another embodiment, the measurement gap determination unit 802 may be configured to determine the measurement gap partly based on a predefined configuration and partly based on a dynamic configuration message. In still another embodiment, the measurement gap determination unit 802 may be configured to determine the measurement gap implicitly based on a frequency gap between the primary carrier and the secondary carrier. For example, a predefined value of G1 for the measurement gap duration may be determined in case the primary carrier and the secondary carrier are in a same frequency band. Otherwise, a predefined value of G2 for the measurement gap duration may be determined.

Optionally, the terminal device may be configured with the primary carrier (e.g., C1), the secondary carrier and a further secondary carrier (i.e., the terminal device is configured with at least two secondary carriers, e.g., C2 and C3) for carrier aggregation. The first receiving unit (801) may be configured to receive a trigger from the base station for the terminal device to transmit the reference signal over the secondary carrier and the further secondary carriers sequentially according to the measurement gap. In one embodiment, the trigger received by the first receiving unit 801 may trigger the terminal device to transmit the reference signal over the secondary carrier and the further secondary carriers sequentially within a single measurement gap. That is, the terminal device is triggered to switch from the primary carrier to the secondary carrier, transmit the reference signal over the secondary carrier, switch to the further secondary carrier, transmit the reference signal over the further secondary carrier and switch back to the primary carrier within the single measurement gap. In another embodiment, the terminal device may be triggered to transmit the reference signal over the secondary carrier and the further secondary carriers sequentially by using two separate measurement gaps. That is, the terminal device may be triggered to switch from the primary carrier to the secondary carrier for transmitting the reference signal over the secondary carrier, and switch back to the primary carrier within one measurement gap, and switch from the primary carrier to the further secondary carrier for transmitting the reference signal over the further secondary carrier within another measurement gap. Further, in some embodiment, the trigger received by the first receiving unit may include a single trigger message or two separate trigger messages.

Additionally or alternatively, in one embodiment, the apparatus 800 may comprise a third receiving unit 805 that is configured to receive an uplink synchronization indication from the base station which indicates how to obtain uplink synchronization of the secondary carrier, e.g., whether uplink synchronization of the secondary carrier can be obtained from uplink synchronization of the primary carrier. In another embodiment, the third receiving unit 805 may be configured to receive the uplink synchronization indication from the base station by detecting a signal for triggering a random access procedure of the terminal device from the base station, and to obtain the uplink synchronization indication based on a result of the detection. For example, the detection of a trigger for the RA procedure may be interpreted by the third receiving unit 805 as an uplink synchronization indication which indicates a need for obtaining the uplink synchronization of the secondary carrier based on RACH procedure. In the case that no trigger for the RA procedure is detected, the third receiving unit 805 may interpret it as an uplink synchronization indication which indicates that the uplink synchronization of the secondary carrier is obtainable from the uplink synchronization of the primary carrier.

Alternatively, in one embodiment, the uplink synchronization indication may be received by the second receiving unit 804 of the terminal device via the configuration message. For example, the configuration message may include information as to whether uplink synchronization of the secondary carrier is obtainable from uplink synchronization of the primary carrier, and/or, a time offset between uplink synchronization for the primary carrier and uplink synchronization for the secondary carrier.

In one embodiment, the transmitting unit 803 may be configured to obtain the uplink synchronization of the secondary carrier according to the uplink synchronization indication received by the third receiving unit 805 or the second receiving unit 804; and transmit the reference signal to the base station over the secondary carrier based on the obtained uplink synchronization of the secondary carrier.

In some embodiments, the wireless communication system in which the terminal device operates is a TDD system and the reference signal transmitted by the transmitting unit 803 can be used for the base station to perform downlink channel estimation. However, embodiments of the present disclosure are not limited to the TDD scenario.

Figure 9:
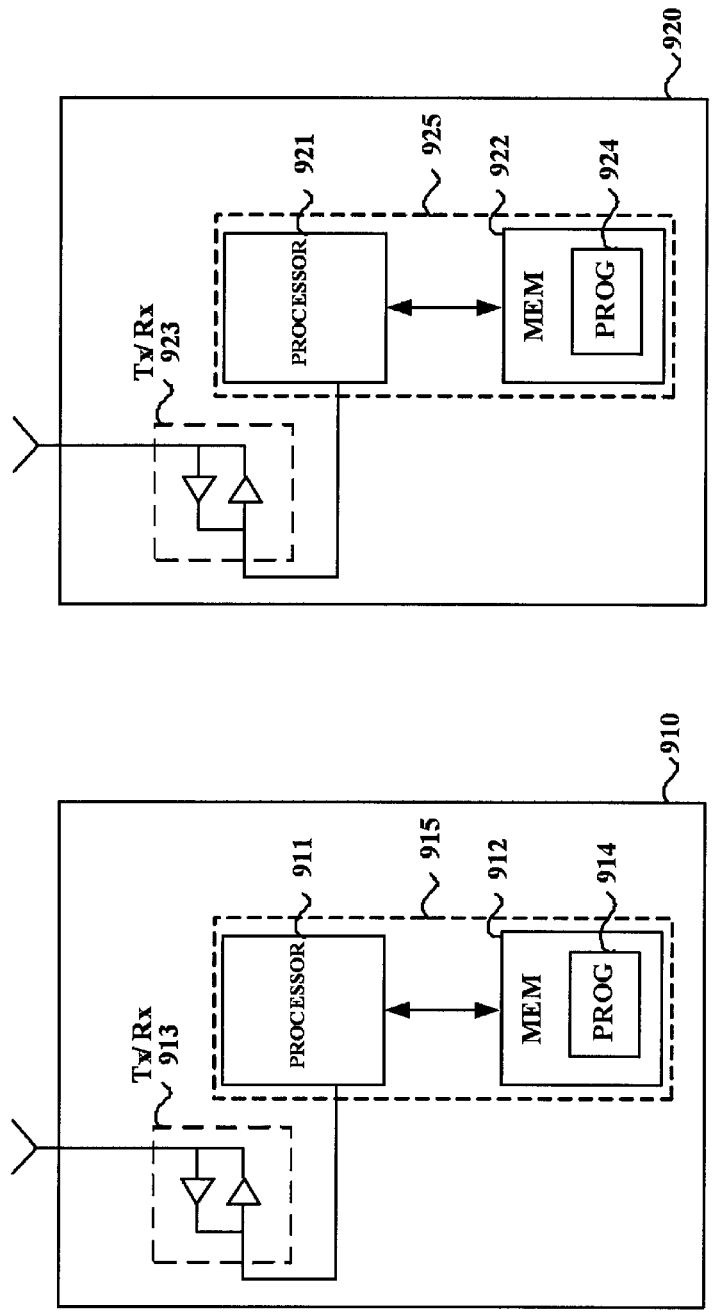
FIG. 9 illustrates a simplified block diagram of an apparatus 910 that may be embodied as/in a base station, and an apparatus 920 that may be embodied as/in a terminal device.

FIG. 9 illustrates a simplified block diagram of an apparatus 910 that may be embodied in/as a base station, e.g., the eNB 201 shown in FIG. 2, and an apparatus 920 that may be embodied in/as a terminal device, e.g., one of the UEs 202 and 203 shown in FIG. 2.

The apparatus 910 may comprise at least one processor 911, such as a data processor (DP) and at least one memory (MEM) 912 coupled to the processor 911. The apparatus 910 may further comprise a transmitter TX and receiver RX 913 coupled to the processor 911. The MEM 912 stores a program (PROG) 914. The PROG 914 may include instructions that, when executed on the associated processor 911, enable the apparatus 910 to operate in accordance with the embodiments of the present disclosure, for example to perform the method 300. A combination of the at least one processor 911 and the at least one MEM 912 may form processing means 915 adapted to implement various embodiments of the present disclosure.

The apparatus 920 comprises at least one processor 921, such as a DP, and at least one MEM 922 coupled to the processor 921. The apparatus 920 may further comprise a suitable TX/RX 823 coupled to the processor 921. The MEM 822 stores a PROG 924. The PROG 924 may include instructions that, when executed on the associated processor 921, enable the apparatus 920 to operate in accordance with the embodiments of the present disclosure, for example to perform the method 400. A combination of the at least one processor 921 and the at least one MEM 922 may form processing means 925 adapted to implement various embodiments of the present disclosure.

Various embodiments of the present disclosure may be implemented by computer program executable by one or more of the processors 911 and 921, software, firmware, hardware or in a combination thereof.

The MEMs 912 and 922 may be of any type suitable to the local technical environment and may be implemented using any suitable data storage technology, such as semiconductor based memory terminal devices, magnetic memory terminal devices and systems, optical memory terminal devices and systems, fixed memory and removable memory, as non-limiting examples.

The processors 911 and 921 may be of any type suitable to the local technical environment, and may include one or more of general purpose computers, special purpose computers, microprocessors, digital signal processors DSPs and processors based on multicore processor architecture, as non-limiting examples.

Although some of the above description is made in the context of a 3GPP LTE-based network, it should not be construed as limiting the spirit and scope of the present disclosure. The principle and concept of the present disclosure may be more generally applicable to other radio networks, for example an ad-hoc network.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory terminal device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Example embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method in a base station for communicating with a terminal device in a wireless communication system, the terminal device being configured with at least a primary carrier and a secondary carrier for carrier aggregation, the method comprising:
   determining whether the primary carrier and the secondary carrier are in a same frequency band;
   based on whether the primary carrier and the secondary carrier are in the same frequency band, determining a measurement gap, the measurement gap indicating a time interval for the terminal device to switch from the primary carrier to the secondary carrier for transmitting a reference signal to the base station over the secondary carrier and to switch back to the primary carrier, the measurement gap being smaller where the primary carrier and the secondary carrier are in the same frequency band and larger where the primary carrier and the secondary carrier are not in the same frequency band;
   triggering the terminal device to transmit the reference signal over the secondary carrier according to the measurement gap; and
   obtaining a channel estimation based on the reference signal received from the terminal device during the measurement gap.

2. The method according to claim 1, further comprising:
   transmitting a configuration message to the terminal device, the configuration message indicating at least one of the following:
   information for the measurement gap,
   a reference signal sequence to be transmitted,
   periodicity of the transmission of the reference signal,
   a resource reserved for the transmission of the reference signal over the secondary carrier, and
   a time offset between uplink synchronization for the primary carrier and uplink synchronization for the secondary carrier.

3. The method according to claim 2, wherein the information for the measurement gap includes a parameter selected from a predefined set of parameters for the measurement gap.

4. The method according to claim 1, wherein said determining the measurement gap is based on
   a predefined configuration for the measurement gap.

5. The method according to claim 1, further comprising:
   determining periodicity of the transmission of the reference signal based on at least one of:
   a beam-forming scheme to be used for downlink transmission to the terminal device and
   mobility of the terminal device.

6. The method according to claim 1, wherein the terminal device is configured with a further secondary carrier, and the triggering comprises:
   triggering the terminal device to transmit the reference signal over the secondary carrier and the further secondary carrier sequentially according to the measurement gap.

7. The method according to claim 1, further comprising:
   determining whether uplink synchronization of the secondary carrier is obtainable from uplink synchronization of the primary carrier; and
   indicating a result of the determination to the terminal device.

8. The method according to claim 7, wherein said determining whether uplink synchronization of the secondary carrier is obtainable from uplink synchronization of the primary carrier is performed by determining whether the primary carrier and the secondary carrier are co-located.

9. The method according to claim 7, wherein the indicating comprises:
   in response to determining that uplink synchronization of the secondary carrier is unobtainable from the uplink synchronization of the primary carrier, implicitly indicating the result of the determination to the terminal device by triggering a random access procedure for the terminal device.

10. The method according to claim 1, wherein the wireless communication system is a Time Division Duplex (TDD) system, and the obtaining comprises:
    obtaining a downlink channel estimation, based on the reference signal received from the terminal device in the uplink and channel reciprocity between the downlink and the uplink of the wireless communication system.

11. A method in a terminal device for communicating with a base station in a wireless communication system, the terminal device being configured with at least a primary carrier and a secondary carrier for carrier aggregation, the method comprising:
    receiving a trigger from the base station for the terminal device to transmit a reference signal over the secondary carrier;
    determining a measurement gap, the measurement gap indicating a time interval for the terminal device to switch from the primary carrier to the secondary carrier for transmitting the reference signal to the base station over the secondary carrier and switch back to the primary carrier, the measurement gap being smaller where the primary carrier and the secondary carrier are in the same frequency band and larger where the primary carrier and the secondary carrier are not in the same frequency band; and
    transmitting the reference signal to the base station over the secondary carrier according to the measurement gap.

12. The method according to claim 11, further comprising:
    receiving a configuration message from the base station, the configuration message indicating at least one of the following:
    information for the measurement gap,
    a reference signal sequence to be transmitted,
    periodicity of the transmission of the reference signal,
    a resource reserved for the transmission of the reference signal in the secondary carrier, and
    a time offset between uplink synchronization for the primary carrier and uplink synchronization for the secondary carrier.

13. The method according to claim 12, wherein the information for the measurement gap includes a parameter selected from a predefined set of parameters for the measurement gap.

14. The method according to claim 11, wherein said determining the measurement gap is based on at least one of:
    a predefined configuration of the measurement gap, and
    a configuration message from the base station.

15. The method according to claim 11, wherein the terminal device is configure with a further secondary carrier, and the receiving comprises:
  receiving a trigger from the base station for the terminal device to transmit the reference signal over the secondary carrier and the further secondary carrier sequentially according to the measurement gap.

16. The method according to claim 11, further comprising:
  receiving an uplink synchronization indication from the base station which indicates whether uplink synchronization of the secondary carrier is obtainable from uplink synchronization of the primary carrier,
  wherein transmitting the reference signal to the base station over the secondary carrier comprises:
  obtaining uplink synchronization of the secondary carrier according to the uplink synchronization indication; and
  transmitting the reference signal to the base station over the secondary carrier based on the obtained uplink synchronization of the secondary carrier.

17. The method according to claim 16, wherein said receiving an uplink synchronization indication from the base station comprises:
  detecting a signal for triggering a random access procedure of the terminal device from the base station, and
  obtaining the uplink synchronization indication based on a result of the detection.

18. The method according claim 11, wherein the wireless communication system is a Time Division Duplex (TDD) system and transmitting the reference signal to the base station is for the base station to perform downlink channel estimation.

19. An apparatus in a base station for communicating with a terminal device in a wireless communication system, the terminal device being configured with at least a primary carrier and a secondary carrier for carrier aggregation, the apparatus comprising a processor and a memory, said memory containing instructions executable by said processor whereby said apparatus is operative to carry out the method according to claim 1.

20. An apparatus in a terminal device for communicating with a base station in a wireless communication system, the terminal device being configured with at least a primary carrier and a secondary carrier for carrier aggregation, the apparatus comprising a processor and a memory, said memory containing instructions executable by said processor whereby said apparatus is operative to carry out the method according claim 11.

* * * * *